(12) United States Patent
Kanellakopoulos et al.

(10) Patent No.: US 9,100,176 B2
(45) Date of Patent: Aug. 4, 2015

(54) METHOD AND SYSTEM FOR INSTALLING AND OPERATING DISCRETE MULTI TONE REPEATERS

(75) Inventors: Ioannis Kanellakopoulos, Cupertino, CA (US); Amit Priebatch, Kfar Saba (IL)

(73) Assignee: ACTELIS NETWORKS (ISRAEL) LTD., Petach Tikva (IL)

( * ) Notice: Subject to any disclaimer, the term of this patent is extended or adjusted under 35 U.S.C. 154(b) by 427 days.

(21) Appl. No.: 13/140,825

(22) PCT Filed: Dec. 23, 2009

(86) PCT No.: PCT/US2009/069478
§ 371 (c)(1),
(2), (4) Date: Oct. 6, 2011

(87) PCT Pub. No.: WO2010/075556
PCT Pub. Date: Jul. 1, 2010

(65) Prior Publication Data
US 2012/0020277 A1 Jan. 26, 2012

Related U.S. Application Data

(60) Provisional application No. 61/140,166, filed on Dec. 23, 2008.

(51) Int. Cl.
*H04L 5/14* (2006.01)
*H04B 3/36* (2006.01)
*H04L 5/00* (2006.01)
*H04L 25/02* (2006.01)

(52) U.S. Cl.
CPC ............... *H04L 5/1461* (2013.01); *H04B 3/36* (2013.01); *H04L 5/0007* (2013.01); *H04L 25/022* (2013.01)

(58) Field of Classification Search
USPC .................. 370/315, 340; 375/222, 227, 260
See application file for complete search history.

(56) References Cited

U.S. PATENT DOCUMENTS 6,317,495 B1 11/2001 Gaikwad et al.
7,356,049 B1 4/2008 Rezvani
(Continued)

OTHER PUBLICATIONS

International Search Report for International Application No. PCT/US2009/069478 mailed Mar. 1, 2010.

*Primary Examiner* — Brandon Renner
(74) *Attorney, Agent, or Firm* — Pearl Cohen Zedek Latzer Baratz LLP

(57) ABSTRACT

A system and method for providing a service over a repeatered link that couples a service provider transceiver to a remote modem, the method includes: computing, for each frequency bin out of multiple frequency bins of a spectrum, a level of far-end cross-talk (FEXT) interference that is generated to a network-side receiver of a frequency division multiplexing (FDM) discrete multi tone (DMT) repeater by a service provider transmitter that provides an FDM DMT service that is supported by the FDM DMT repeater; computing, for each frequency bins out of the multiple frequency bins, a highest allowable transmit power level of a customer-side transmitter of the FDM DMT repeater that generates to the network-side receiver of the FDM DMT repeater a cross-talk interference that does not exceed a level of FEXT interference that is generated to the network-side receiver of the FDM DMT repeater by the service provider transmitter.

23 Claims, 9 Drawing Sheets

(56) References Cited

U.S. PATENT DOCUMENTS

| | | |
|---|---|---|
| 2002/0044597 A1* | 4/2002 | Shively et al. ............... 375/222 |
| 2005/0152385 A1* | 7/2005 | Cioffi ........................... 370/420 |
| 2007/0274404 A1 | 11/2007 | Papandriopoulos et al. |
| 2008/0051096 A1* | 2/2008 | Rao .............................. 455/449 |
| 2008/0144493 A1* | 6/2008 | Yeh .............................. 370/230 |
| 2009/0245340 A1* | 10/2009 | Sorbara et al. ............... 375/227 |
| 2010/0081449 A1* | 4/2010 | Chaudhri et al. .......... 455/452.2 |
| 2011/0026934 A1* | 2/2011 | Boyd ............................ 398/156 |

* cited by examiner

```
┌─────────────────────────────────────────────────────────────────────┐
│  Determining the total length of the repeatered link, the makeup of the copper
│  loops (i.e., what is the gauge and length of the copper wires that make up these
│    loops), the maximum number of repeater locations, the maximum number of
│   copper pairs that can be included in the bonded copper link, the desired bitrate
│     of the repeatered link, the possible locations of residential DSL receivers that
│      need to be protected from spectral interference, and the maximum acceptable
│         level of interference on residential DSL receivers at each of these possible
│                                  locations
│                                     610
└─────────────────────────────────────────────────────────────────────┘
                                      │
                                      ▼
┌─────────────────────────────────────────────────────────────────────┐
│   Defining a vector of possible segment lengths for each of the segments in the
│                             repeatered link
│                                  620
└─────────────────────────────────────────────────────────────────────┘
                                      │
                                      ▼
┌─────────────────────────────────────────────────────────────────────┐
│    For each possible combination of segment lengths that add up to the total
│     length of the repeatered link, and for each number of copper pairs in the
│                               bonded link
│
│       repeating stages 320-350 with the maximum acceptable level of
│    interference defined in stage 610, and computing an appropriate PSD
│     shape for each of the repeaters, using the computed PSD shapes,
│       and estimating the maximum achievable bitrate of the repeatered link
│                                  630
└─────────────────────────────────────────────────────────────────────┘
                                      │
                                      ▼
┌─────────────────────────────────────────────────────────────────────┐
│    Identifying the combinations of segment lengths and number of copper pairs
│   that can provide the desirable bitrate on the repeatered link while generating no
│    more than the maximum acceptable level of interference on residential DSL
│                                 services
│                                   640
└─────────────────────────────────────────────────────────────────────┘
                                      │
                                      ▼
┌─────────────────────────────────────────────────────────────────────┐
│   Selecting a combination, out of the identified combinations, that optimizes a
│                             specified criterion
│                                   650
└─────────────────────────────────────────────────────────────────────┘
```

METHOD AND SYSTEM FOR INSTALLING AND OPERATING DISCRETE MULTI TONE REPEATERS

CROSS-REFERENCE TO RELATED APPLICATIONS

This application is a National Phase Application of PCT International Application No. PCT/US2009/069478, entitled "METHOD AND SYSTEM FOR INSTALLING AND OPERATING DISCRETE MULTI TONE REPEATERS", International Filing Date Dec. 23, 2009, published on Jul. 1, 2010 as International Publication No. WO 2010/075556, which in turn claims priority from U.S. Provisional Patent Ser. No. 61/140,166, filing date Dec. 23, 2008, titled "SPECTRALLY FRIENDLY DMT REPEATERS", both of which are incorporated herein by reference in their entirety.

FIELD OF THE INVENTION

The present invention relates to installation and to the operation of frequency division multiplexing (FDM) discrete multi tone (DMT) repeaters.

BACKGROUND OF THE INVENTION

One of the most effective and efficient methods of deploying high-speed digital services to business and residential customers is to use one of the many forms of DSL (Digital Subscriber Loop) technologies over copper telephone wires. This approach has become very popular in the last 20 years due to the fact that copper wires are already deployed almost everywhere and are quite easy to access, both at the Central Office (CO) and at the remote cabinet or the customer premises.

However, one of the main limitations of DSL technology is that the data capacity of copper wires decreases significantly as the length of the copper loop increases. Therefore, customers located more than a few kilometers from the Central Office can not be provided with high data speeds over copper wires.

One way to mitigate this issue is to use multiple copper pairs to the same customer location, thereby increasing the total data rate of the resulting multi-pair copper link. This method is typically referred to as "bonding" of copper pairs.

Another method for extending the reach of DSL services is to utilize repeaters. These are devices that are installed in intermediate locations on the copper loop, and contain one or more transceivers that receive and re-transmit the signal from neighboring devices. The resulting repeatered copper link is composed of multiple shorter segments that are connected to each other with repeaters. As a result, the capacity of the original long copper loop is increased to the capacity of the longest of these multiple shorter segments.

Repeaters can also be combined with bonding to further increase the rate and reach of DSL services by using multiple copper pairs, each of which is partitioned into multiple repeatered segments.

The deployment of repeaters faces many operational challenges including, but not limited to, installation procedures, proper electrical grounding and shielding, providing power over the copper wires, and remote troubleshooting and management to avoid the need to dispatch a technician to the field every time there is a problem with one of the multiple repeaters.

However, the main reason why repeaters are not widely used today is their potential for generating significant spectral interference to residential DSL services, which have become ubiquitous in the last decade. Spectral interference between different high-bitrate services in a copper binder is caused by the fact that each copper pair acts as an antenna. The signal transmitted on each copper pair, which is intended for the receiver located at the other end of that copper pair, is also inadvertently picked up by all of the neighboring copper pairs, because those pairs are not individually shielded from each other. This creates the well-known phenomenon of "cross-talk", aptly named for the effect it caused in the early days of the telephone, when the telephone discussion taking place on one line could sometimes be overheard by the people conversing on a different line.

Due to the physical characteristics of copper pairs, and in particular due to the average length of the twist between the two copper wires making up each pair, the cross-talk coupling between different pairs increases exponentially with the frequency of the transmitted signal. But this cross-talk coupling is only one of the three factors that determine the strength of cross-talk; the other two are the strength of the disturbing transmitter and the sensitivity of the disturbed receiver at any given frequency. For example, if the transmit frequency band of a transmitter is different than the receive frequency band of a neighboring receiver, then there will be almost no cross-talk from that particular transmitter to that particular receiver.

This strong dependence of cross-talk interference on the overlap of transmit and receive frequency bands is one of the main reasons for the proliferation of DMT (Discrete Multi-Tone) technology in devices used for deployment of residential DSL services, such as ADSL, ADSL2, ADSL2+, VDSL, and VDSL2 services. Almost all DMT devices utilize Frequency Division Multiplexing (FDM), which means that they use different frequency bands for upstream and downstream transmission. Therefore, their upstream transmitters generate very low Near-End Cross-Talk (NEXT) interference to the downstream receivers of neighboring lines, and their downstream transmitters generate very low NEXT interference to the upstream receivers of neighboring lines.

In fact, in the case of FDM DMT services, the only potentially significant cross-talk is Far-End Cross-Talk (FEXT), generated from their upstream or downstream transmitters to the upstream or downstream receivers of neighboring lines. Since FEXT is generated by transmitters that are located at the other end (i.e., the "far end") of the link, it attenuates as it propagates through the copper wires until it reaches the victim receivers. Therefore, FEXT becomes weaker as the distance between the disturbing transmitter and the victim receiver increases, and thus has a noticeable effect only when that distance is relatively short, typically less than 4-5 Kft (1.2-1.5 km). As a result, in typical deployment scenarios where most loops are longer than 4-5 Kft, FEXT is not a significant source of interference.

Nevertheless, there are two important deployment scenarios where FEXT is the dominant source of interference. The first one is the deployment of very high speed services using VDSL or VDSL2, where the loops are typically shorter than 5 Kft (1.5 km). The second one is the deployment of any FDM DMT service from a remotely-located cabinet, specifically when the cables that go from the cabinet to the customer locations also carry FDM DMT services deployed from the Central Office (CO). In this scenario, the cabinet is located much closer to those customer locations than the CO. Therefore, the downstream transmitters of the cabinet-deployed services are much closer to the downstream receivers of the CO-deployed services than their own transmitters, which are located at the CO much farther up the network. As a result, the downstream FEXT from the cabinet-deployed transmitters is quite strong, as it is attenuated only by a short distance, while the main downstream signal coming from the CO-deployed transmitters is relatively weak, as it attenuated by a much longer distance.

The problem of the strong FEXT generated by cabinet-deployed services to CO-deployed services is often referred to as the "near-far" interference problem, due to the fact that the disturbing cabinet-deployed transmitters are located "near" the victim receivers, while the victim receivers' own transmitters are located "far", namely at the CO.

The first repeaters used Alternate Mark Inversion (AMI) or High Density Bipolar order 3 (HDB3) line codes to deliver T1 (1.544 Mbps) or E1 (2.048 Mbps) services over longer copper loops. These technologies made very inefficient use of frequency bands, utilizing almost 2 MHz of frequency spectrum to deliver a mere 1.544 or 2.048 Mbps over 2 copper pairs at distances no longer than 1-1.5 km. Later on, symmetric DSL standards such as HDSL (High-speed DSL), HDSL2, HDSL4 and SHDSL (Single-pair High-speed DSL) allowed deployment of the same T1/E1 services over repeatered copper links while making more efficient use of the frequency spectrum and reducing the number of repeater locations and repeatered segments compared with the original AMI/HDB3 methods.

Despite these advancements in repeater technology, the proliferation of residential DSL services resulted in a significant reduction in the deployment of repeaters. The main reason is that repeaters typically generate much stronger cross-talk into residential DSL receivers than non-repeatered services deployed from the Central Office. This is because repeaters are placed much closer to remotely located residential DSL receivers, and therefore they result in the aforementioned near-far interference problem.

Repeaters that utilize single-carrier technologies like HDSL, HDSL2, HDSL4, and SHDSL typically utilize the same frequency band for upstream and downstream transmission, and therefore they create strong FEXT and even stronger NEXT interference to adjacent DSL receivers. As a result, most countries have imposed significant restrictions on the use of repeaters in the outside loop plant. For example, the American National Standards Institute has issued recommendation T1.417, which specifies that repeaters using should only be deployed in North America with bitrate of approximately 768 Kbps per copper pair when used with HDSL4 technology, or approximately 634 Kbps per pair when used with SHDSL technology. This restriction is designed to reduce the frequency band of the disturbing signal to approximately 150 kHz, in order to minimize its overlap with the downstream frequency band of residential DSL services, which typically starts at 140 kHz. Other countries have imposed similar restrictions; for example, several European countries limit the bitrate of repeaters to 1 Mbps per copper pair.

As for FDM DMT repeaters, they have the potential for creating even stronger near-far interference than single-carrier repeaters. This is because most DMT repeaters operate their downstream transmitters in exactly the same higher frequency band used by the downstream receivers of residential DSL services. Since the strength of the cross-talk coupling between different copper pairs increases exponentially with the frequency of the transmitted signal, this means that the FEXT generated by FDM DMT repeaters can cause significant deterioration of the achievable bitrate rates of adjacent CO-deployed FDM DMT receivers. This potential for very strong near-far interference is the main reason why FDM DMT repeaters have not been deployed in any significant numbers thus far.

All these restrictions have severely limited the utility of repeaters for delivery of high-speed data services. For example, consider the problem of wireless backhaul, which involves providing a high-speed communications link between the Central Office and wireless base stations, so that these base stations can effectively provide high-speed data services to wireless subscribers. In the particular case where the required bitrate for the backhaul link is 20 Mbps, and the wireless base station is 10 km away from the Central Office, so that repeaters are required, it would take 26 copper pairs to deliver this service under a restriction of 768 Kbps per pair, and 32 pairs under a restriction of 634 Kbps per pair. Clearly, utilizing that many copper pairs for one 20 Mbps link is impractical and expensive.

Therefore, it would be highly desirable to install and operate repeaters in a way that provides significantly higher bitrates per copper pair and yet does not generate significant levels of spectral interference to residential DSL services.

SUMMARY OF EMBODIMENTS OF THE INVENTION

According to an embodiment of the invention a method is provided. The method for providing a service over a repeatered link that couples a service provider transceiver to a remote modem, may include: (i) computing, for each frequency bin out of multiple frequency bins of a spectrum, a level of far-end cross-talk (FEXT) interference that is generated to a network-side receiver of a frequency division multiplexing (FDM) discrete multi tone (DMT) repeater by a service provider transmitter that provides an FDM DMT service that is supported by the FDM DMT repeater; (ii) computing, for each frequency bins out of the multiple frequency bins, a highest allowable transmit power level of a customer-side transmitter of the FDM DMT repeater that generates to the network-side receiver of the FDM DMT repeater a cross-talk interference that does not exceed a level of FEXT interference that is generated to the network-side receiver of the FDM DMT repeater by the service provider transmitter; (iii) computing a modified power spectral density (PSD) shape so that in each of the multiple frequency bins, a value of the PSD does not exceed the highest allowable transmit power of that frequency bin; (iv) receiving by the network-side receiver of the FDM DMT repeater network-side input signals; (v) generating customer-side output signals that convey a same information as the network-side input signals but have the modified PSD shape; and (vi) transmitting to the remote modem the customer-side output signals.

According to an embodiment of the invention a frequency division multiplexing (FDM) discrete multi tone (DMT) repeater is provided. The FDM DMT repeater includes: a network-side receiver for receiving network-side input signals; a network-side transmitter; a customer-side receiver; a customer-side transmitter for generating customer-side output signals that convey a same information as the network-side input signals but have a modified PSD shape; a processor, for: computing, for each frequency bin out of multiple frequency bins of a spectrum, a level of far-end cross-talk (FEXT) interference that is generated to the network-side receiver by a service provider transmitter that provides an FDM DMT service that is supported by the FDM DMT repeater; computing, for each frequency bin out of the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter; and computing the modified power spectral density (PSD) shape so that in each frequency bin out of the multiple frequency bins, a value of the PSD does not exceed the highest allowable transmit power.

According to an embodiment a method for determining a configuration of a repeatered link is provided. The method may include: computing, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater; computing, for each configuration of the repeatered link out of the group of candidate repeatered link configurations and for the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter; computing, for each configuration of the repeatered link out of the group of candidate repeatered link configurations a modified power spectral density (PSD) shape so that in each of the multiple frequency bins, a value of the PSD does not exceed the highest allowable transmit power; computing, for each configuration of the repeatered link out of the group of candidate repeatered link configurations a maximum bitrate over the repeatered link based on the modified PSD of the repeatered link; identifying, out of the group of candidate repeatered link configurations, a set of candidate configurations of the repeatered link that provide at least a desired bitrate while generating no more than a maximum acceptable level of interference on residential digital subscriber loop services; and selecting a selected configuration out of the set of candidate configurations based on at least one selection criterion.

According to an embodiment of the invention a configuration system is provided. The configuration system includes: a far-end cross-talk calculator to compute, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater; a power level calculator, to compute, for each configuration of the repeatered link out of the group of candidate repeatered link configurations and for the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter; a power spectral density calculator to compute, for each configuration of the repeatered link out of the group of candidate repeatered link configurations a modified power spectral density (PSD) shape so that in each of the multiple frequency bins, a value of the PSD does not exceed the highest allowable transmit power; a bitrate calculator to compute, for each configuration of the repeatered link out of the group of candidate repeatered link configurations a maximum bitrate over the repeatered link based on the modified PSD of the repeatered link; an identification module to identify, out of the group of candidate repeatered link configurations, a set of candidate configurations of the repeatered link that provide at least a desired bitrate while generating no more than a maximum acceptable level of interference on residential digital subscriber loop services; and a selection module to select a selected configuration out of the set of candidate configurations based on at least one selection criterion.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 illustrates a method according to an embodiment of the invention;

DETAILED DESCRIPTION OF THE PRESENT INVENTION

Figure 1:
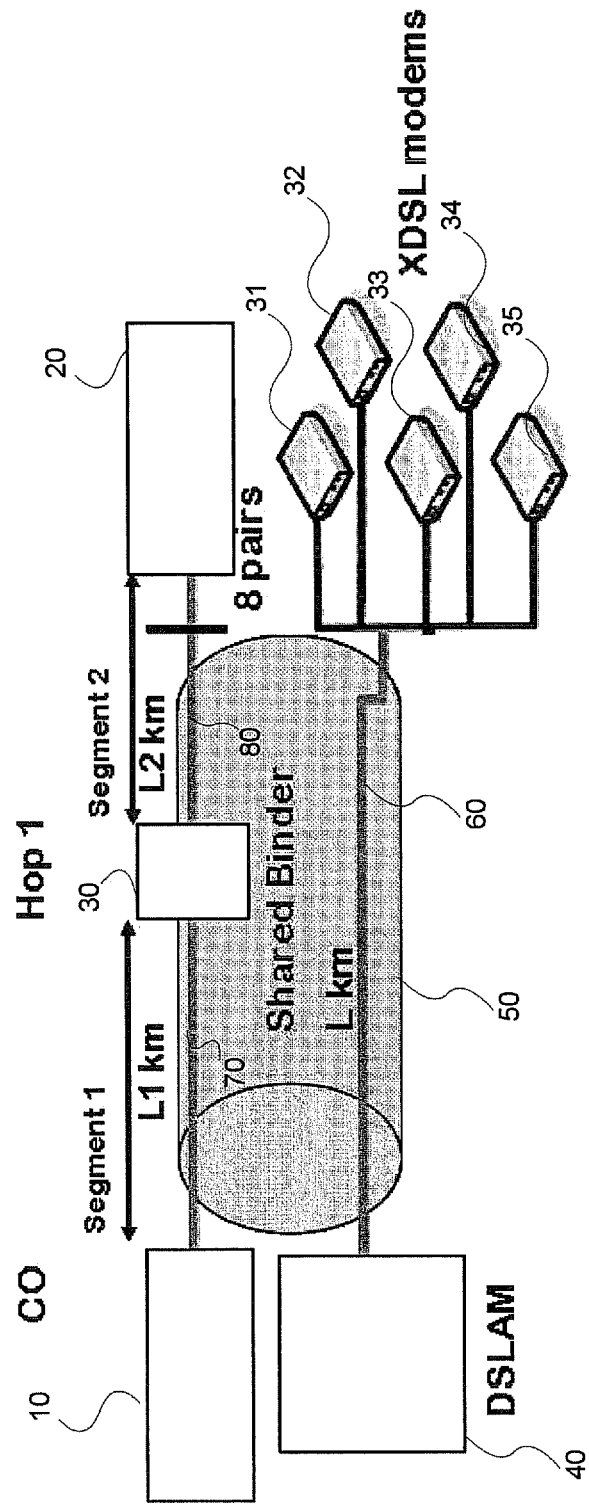
FIG. 1 illustrates an FDM DMT repeater and its environment according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

According to various embodiments of the invention an FDM DMT repeater is provided, and a method for installing FDM DMT repeaters and a method for operating FDM DMT repeaters are provided. These methods and FDM DMT repeaters facilitate a delivering of high-speed digital services over bonded copper pairs using FDM DMT repeaters at significantly higher bitrates than typically achieved by repeaters that comply with regional spectral regulations, while significantly reducing the spectral impact of these repeaters to other systems, particularly residential DSL services.

An FDM DMT repeater reconstructs and modifies signals and performs an analog to digital conversion, digital domain processing and digital to analog conversion. Thus, the FDM DMT repeater is not merely an amplifier. Specifically, the FDM DMT repeater has two sets of one or more FDM DMT transceivers that communicate with corresponding transceivers in both directions (network-side and customer-side) of a repeatered link.

AN FDM DMT repeater receives input analog signals (from the network-side or the customer side of the repeatered link), converts them to digital bits (by the receivers on that side of the FDM DMT repeater), and then converts the digital bits into output analog signals that are re-transmitted to the other side of the repeatered link (by the transmitters on that side of the FDM DMT repeater) as output analog signals. The output analog signals of such an FDM DMT repeater carry essentially the same digital information as the input analog signals of said repeater, but may differ by at least one analog characteristic (such as power spectral density) from the input analog signals.

It is noted that while the re-transmitted signals contain essentially the same digital information as the original received signals, their analog signal characteristics may be very different. In particular, the Power Spectral Density (PSD) and total frequency band used by the re-transmitted signals may be very different than the PSD and frequency band of the original received signals.

According to an embodiment of the invention a method is provided for determining a configuration of a repeatered link—how many FDM DMT repeaters to deploy and where to physically locate said repeaters. Additionally or alternatively, a method for operating FDM DMT repeaters is provided. The latter method can determine how to shape the PSD of the output analog signals of said repeaters so that the cross-talk interference they generate to adjacent DSL receivers is reduced significantly. The latter method can result in essentially eliminating the near-far interference problem.

A method is provided. The method includes the following stages: (i) computing, for each configuration of the repeatered link out of a group of candidate repeatered link configurations and for multiple frequency bins of a spectrum, a level of far-end cross-talk (FEXT) interference that may be generated to a network-side receiver of a frequency division multiplexing (FDM) discrete multi tone (DMT) repeater of the repeatered link by FDM DMT transmitters that are part of transceivers located at the Central Office (CO) or another service provider location (hereinafter referred to as "service provider transceivers", and their corresponding transmitters and receivers referred to as "service provider transmitters" and "service provider receivers"); (ii) computing, for each configuration of the repeatered link out of a group of candidate repeatered link configurations and for each of the multiple frequency bins, a highest allowable transmit power level of a customer-side transmitter of the FDM DMT repeater that would generate to other FDM DMT receivers, which may be located at approximately the same location in the network as the network-side receiver of the same FDM DMT repeater, a cross-talk interference that does not exceed the level of FEXT interference that is generated to the network-side receiver of the FDM DMT repeater by the service provider transmitter; (iii) computing, for each configuration of the repeatered link out of a group of candidate repeatered link configurations a modified power spectral density (PSD) shape so that in each of the multiple frequency bins, a value of the PSD does not exceed the highest allowable transmit power; (iv) computing, for each configuration of the repeatered link out of a group of candidate repeatered link configurations a maximum bitrate over the repeatered link based on the modified PSD of the repeatered link; (v) identifying, out of the group of candidate repeatered link configurations, a set of configurations of the repeatered link that provide a bitrate that is equal to or higher than a desired bitrate while generating a level of interference on residential digital subscriber loop services that is less than or equal to a maximum acceptable level of interference; and (vi) selecting a selected configuration out of the set of configurations based on at least one selection criterion.

The method may include defining the group of candidate configurations of the repeatered link based on at least two of the following parameters: a total length of the repeatered link, a set of characteristics of copper pairs such as wire gauge and type of insulation, a maximum number of repeater locations, a maximum number of copper pairs that may be included in a bonded copper link that comprises a copper pair to which the FDM DMT repeater is connected, a location of residential digital subscriber loop receivers to be protected from spectral interference, and a maximum acceptable level of interference on residential digital subscriber loop receivers.

In typical cabinet-based deployment scenarios, the near-far problem is mitigated by lowering the transmit power of cabinet-deployed transmitters in the frequency band where CO-deployed receivers operate. For example, service providers typically lower the transmit power of cabinet-deployed VDSL2 by about 20 dB for frequencies up to 2.2 MHz, because this is the frequency band in which CO-deployed ADSL2+ services operate. The lower transmit power decreases the strength of the FEXT interference generated by the cabinet-deployed VDSL2 transmitters into the CO-deployed ADSL2+ receivers.

However, this simple power reduction is far from the optimal solution in the case of repeatered services. In the case of repeatered services, it is desirable to minimize the number of repeater locations, in order to reduce the expense associated with purchasing, installing, and operating repeaters, and also to maximize the achievable bitrate per copper pair, in order to reduce the expense associated with utilizing many copper pairs to achieve a given target total bitrate. Therefore, a simple power reduction in frequencies up to 2.2 MHz is not an appropriate solution, since it requires that either the distance between repeater locations be significantly reduced (and thus the number of repeater locations needed to reach a certain point be significantly increased) in order to maintain an acceptably high bitrate per copper pair, or that the number of repeatered copper pairs be significantly increased in order to achieve the desired target bitrate with a significantly lower bitrate per copper pair.

A better tradeoff between the bitrate achieved by a repeater and the spectral interference generated by the same repeater may be provided by utilizing the additional information that is available in the case of FDM DMT repeaters, namely the PSD shapes, bitloading maps and per-bin SNR (Signal-to-Noise Ratio) of the network-side receivers.

For example, a typical repeatered link that is deployed from the CO may be considered. On the first repeatered segment, the FDM DMT transceivers may operate without any restrictions, since the interference they generate to other CO-deployed services is at the same level as that of the CO-deployed services themselves. In other words, the first repeatered segment does not generate the near-far interference problem, and therefore its operation does not need to be restricted.

At the first repeater location, the network-side receivers will therefore use PSD shapes and bitloading maps and achieve per-bin SNR values that are very similar to those of other CO-deployed services whose copper loops have approximately the same effective length as the first repeatered segment.

This information can be used to compute downstream PSD shapes that, when used to transmit signals from the repeater location, would generate acceptably low levels of cross-talk interference to other FDM DMT receivers that may be located at approximately the same location in the network as the network-side receivers of the FDM DMT repeater even with the highest possible levels of cross-talk couplings, and then use these PSD shapes in the downstream (customer-side) transmitters of the FDM DMT repeaters.

For example, it is possible to compute downstream PSD shapes that would generate a level of interference similar to the FEXT generated by CO-deployed downstream transmitters of the same FDM DMT service, since that low level of FEXT would be characterized as an "acceptably low" interference level.

However, the objective of "acceptably low" interference has to be balanced with the objective of high bitrate per repeatered copper pair. This means that the first repeater location should be selected so that the transceivers operating on the second segment can achieve comparable levels of bitrate per pair as on the first segment, while using significantly lower PSD levels in the frequency band utilized by the transceivers of the first segment. As a result, the computed PSD shapes for the downstream transmitters of the second segment may have higher transmitted power levels at higher frequency bins, above the highest frequency bins that the network-side receivers at the first repeater location are able to utilize for transmitting information.

This means that the typical computed downstream PSD shape for the second segment will be quite low in the frequency bins utilized by the network-side receivers, and will then gradually increase in higher frequency bins. This also means that in order to optimize the tradeoff between minimizing the number of repeater locations and maximizing the achievable bitrate per repeatered copper pair, the second segment of the repeatered link should typically be shorter than the first segment, in order to guarantee relatively low insertion loss on the higher frequency bins and thus be able to load more bits on these higher frequency bins.

In most realistic deployment scenarios, the repeater transceivers of the third and subsequent segments of the repeatered link will be able to utilize lower frequency bins than the transceivers of the second segment. This is because the CO-deployed services potentially affected by those transceivers are operating on longer loops than those affected by the transceivers of the second segment, and therefore their receivers are able to utilize an even smaller portion of the frequency band.

Accordingly, the FDM DMT transceivers on the third and subsequent repeatered segments are able to utilize lower frequency bins without exceeding the "acceptable" level of interference on adjacent receivers of CO-deployed services, since those receivers are not able to use those lower frequency bins on these longer loops.

Figure 9:
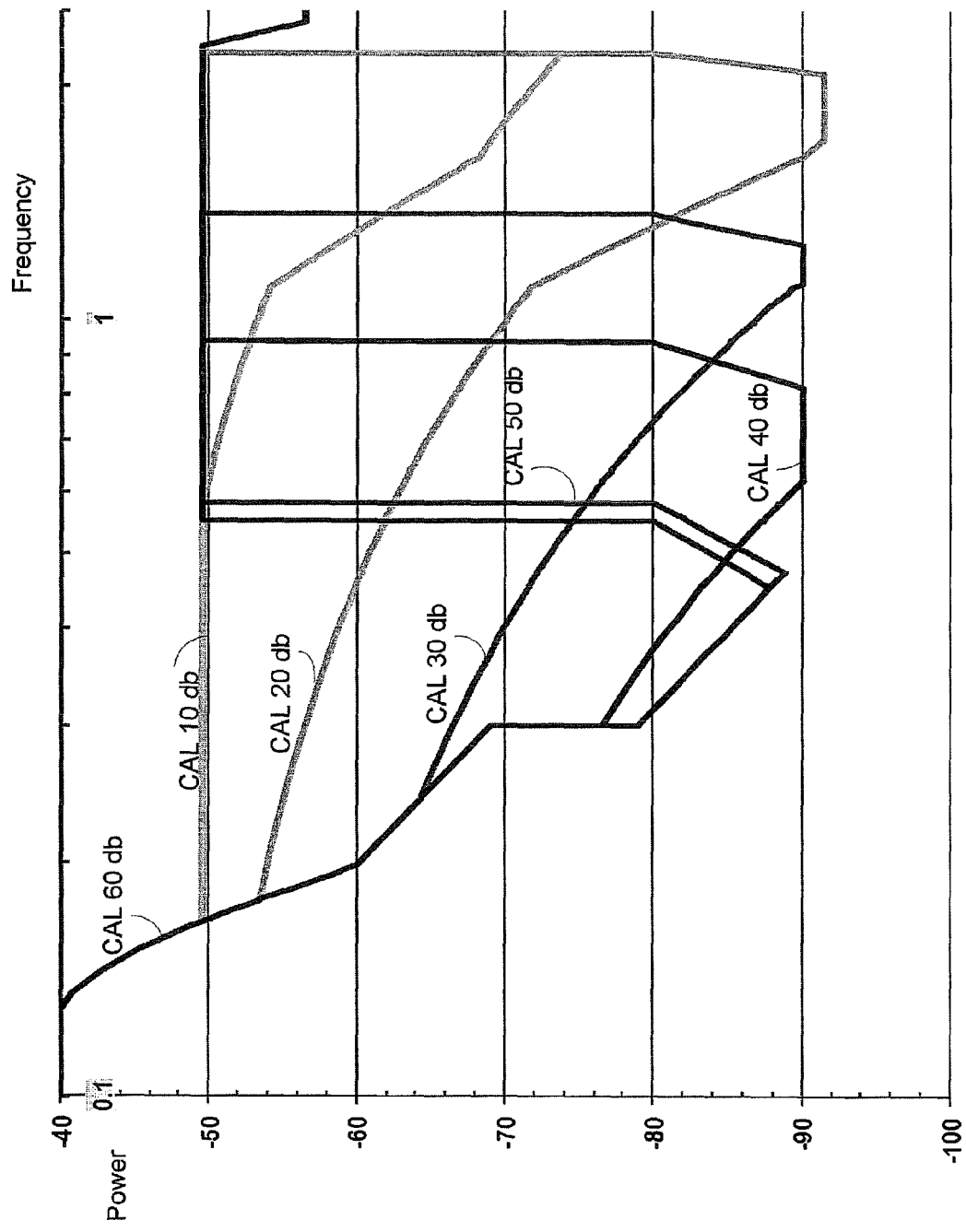
FIG. 9 illustrates an Access Network Frequency Plan.

The PSD-shaping method described here for repeater transmitters differs from the PSD limits specified in the spectral compatibility regulations used in the United Kingdom, called the Access Network Frequency Plan (ANFP). The ANFP specifies maximum PSD limits for cabinet-deployed transmitters that attempt to reduce the near-far interference problem. These maximum PSD limits are specified as a function of the Cabinet Assigned Loss (CAL), which is a representative value of the insertion loss of the copper loops deployed from the CO to the cabinet at issue. FIG. 9 illustrates the maximum PSD limits for different CAL values according to one version of the ANFP.

The method proposed in the present invention does not utilize pre-computed PSD shapes as specified in the ANFP. Instead, it automatically computes the appropriate PSD shapes to be used by the customer-side transmitters of the FDM DMT repeater based on the information available from the network-side receivers of the same FDM DMT repeater.

The proposed method essentially eliminates the near-far interference problem, and this will be illustrated through an example that considers the effect of the computed PSD shapes on other CO-deployed receivers.

This example takes into account downstream receivers of CO-deployed services that are located closer to the CO than the repeater location, namely on the network side of the repeater.

Since the computed PSD shapes are used on the customer side of the FDM DMT repeater, it is likely that there is essentially no cross-talk coupling between the customer-side repeatered copper pair segments and any copper pairs originating from the CO and terminated before the FDM DMT repeater location, namely on the network side of the repeater location. And even if we were to assume that some cross-talk coupling does indeed exist between customer-side copper pair segments and network-side terminated copper pairs, the level of interference generated to the corresponding CO-deployed receivers on the network-side terminated copper pairs would be lower than the FEXT interference generated by other CO-deployed transmitters, and therefore it would certainly be characterized as "acceptably low".

This example also takes into account downstream receivers of CO-deployed services that are located farther from the CO than the repeater location, namely on the customer side of the FDM DMT repeater. Since those CO-deployed receivers are located farther from the CO than the network-side receivers of the repeater, they will typically be able to achieve lower bitrates than the network-side receivers of the FDM DMT repeater.

In particular, the highest frequency bins that are loaded with data bits will generally be at lower frequencies for those CO-deployed receivers than for the network-side receivers of the FDM DMT repeater. In addition, the signals transmitted by the customer-side transmitters of the FDM DMT repeater will be further attenuated before reaching these CO-deployed receivers.

As a result, the lower-frequency part of the customer-side transmitted repeater signals, where the computed PSD shapes are low, will still generate a level of interference similar to the FEXT generated by CO-deployed transmitters of the same FDM DMT service, thereby making it "acceptably low". As for the higher-frequency part of the customer-side transmitted repeater signals, it will be even further removed from the usable frequency band of these farther-located CO-deployed receivers, so it will generate even less interference than it generates to CO-deployed receivers located at the repeater location.

This demonstration illustrates that the level of cross-talk interference generated by an FDM DMT repeater to adjacent receivers of CO-deployed services is maximized when the CO-deployed receiver is located at the same location as the repeater, and it is lower for CO-deployed receivers that are located either closer to the CO or farther from the CO than the repeater location. Therefore, if the PSD shape used to transmit signals from a repeater is computed to generate an "acceptably low" level of interference to the receivers of the repeater itself, it will also be guaranteed to generate an even lower (and thus also "acceptably low") level of interference to CO-deployed receivers located either closer to the CO or farther from the CO than the repeater location.

Figure 3:
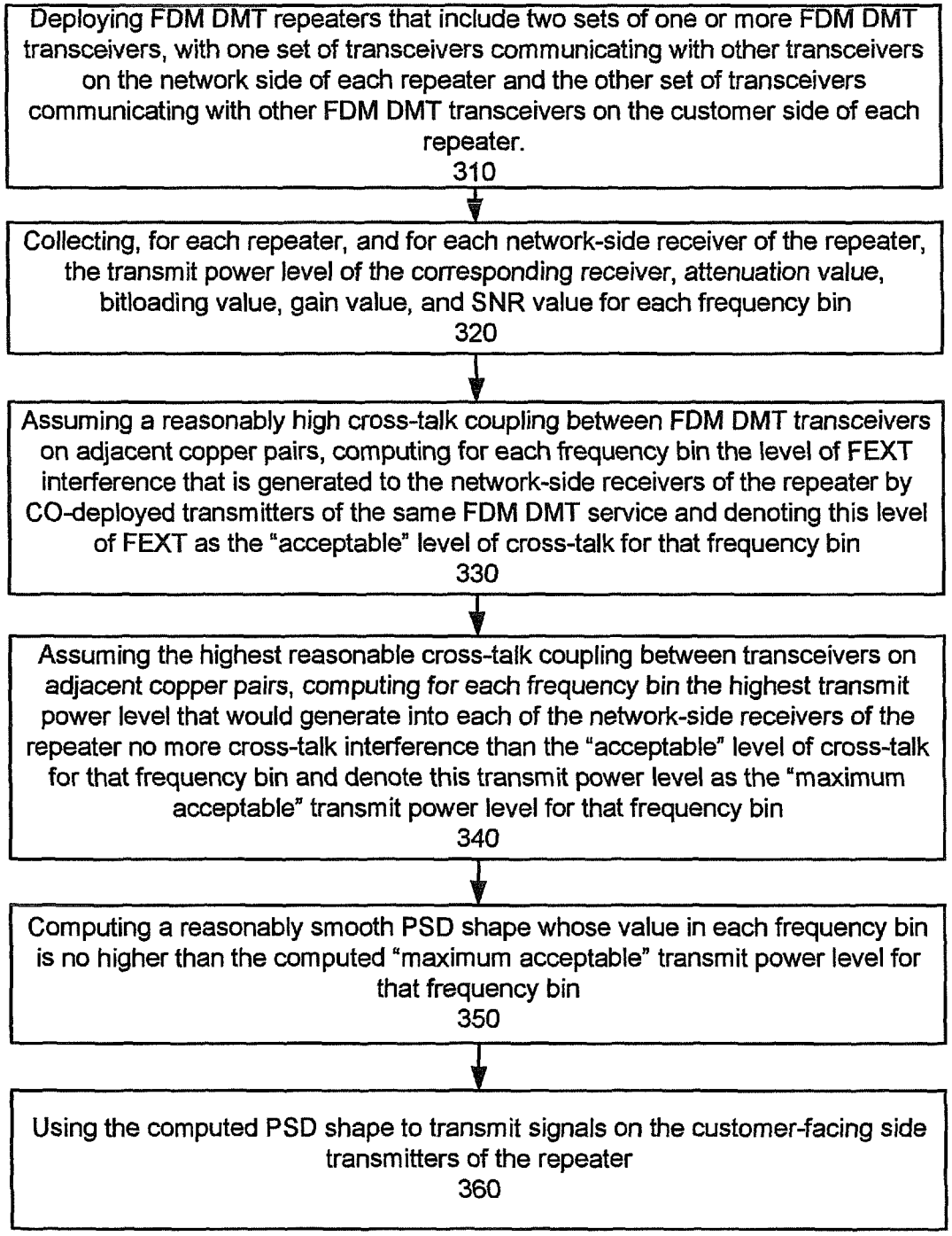
FIG. 3 illustrates a method according to an embodiment of the invention.

FIG. 3 illustrates method 300 according to an embodiment of the invention.

Method 300 starts by stage 310 of deploying FDM DMT repeaters that include two sets of one or more FDM DMT transceivers, with one set of FDM DMT transceivers communicating with other FDM DMT transceivers on the network side of each repeater and the other set of FDM DMT transceivers communicating with other FDM DMT transceivers on the customer side of each repeater.

Stage 310 is followed by stage 320 of collecting, for each repeater, and for each network-side receiver of the repeater, multiple operating parameters, such as transmit power level, attenuation value, bitloading value, gain value, and SNR value for each frequency bin.

Stage 320 is followed by stage 330 of computing, while assuming a reasonably high cross-talk coupling between transceivers on adjacent copper pairs, for each frequency bin the level of FEXT interference that is generated to the network-side receivers of the repeater by CO-deployed transmitters of the same FDM DMT service. Stage 330 also includes denoting this level of FEXT as the "acceptable" level of cross-talk for that frequency bin.

Alternatively, stage 330 may include denoting an "acceptable" level of cross-talk for each frequency bin that differs (lower or higher) than the computed FEXT interference—for example in order to comply with regional spectral regulations or with the requests of a network operator.

Stage 330 is followed by stage 340 of computing, while assuming the highest reasonable cross-talk coupling between transceivers on adjacent copper pairs, for each frequency bin the highest transmit power level that would generate into each of the network-side receivers of the repeater no more cross-talk interference than the "acceptable" level of cross-talk for that frequency bin. Stage 340 also includes denoting this transmit power level as the "maximum acceptable" transmit power level for that frequency bin.

Alternatively, stage 340 may include denoting a "maximum acceptable" transit power level for each frequency bin that differs (lower or higher) than the computed transmit power level—for example in order to comply with regional spectral regulations or with the requests of a network operator.

Stage 340 is followed by stage 350 of computing a reasonably smooth PSD shape whose value in each frequency bin is no higher than the computed "maximum acceptable" transmit power level for that frequency bin.

Stage 350 is followed by stage 360 of using this computed PSD shape to transmit signals on the customer-side transmitters of the repeater.

Figure 4:
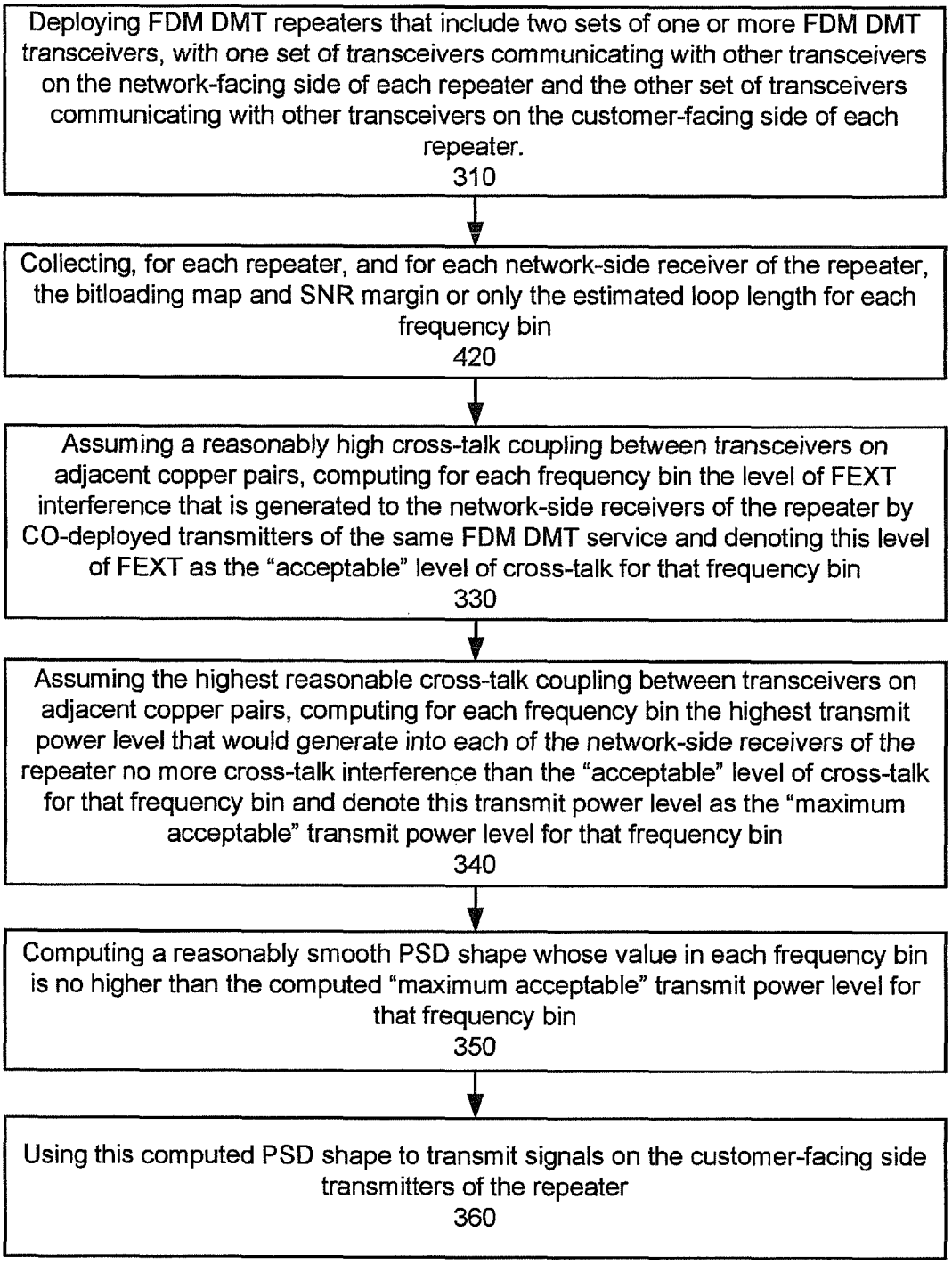
FIG. 4 illustrates a method according to an embodiment of the invention.

FIG. 4 illustrates method 400 according to an embodiment of the invention.

Method 400 differs from method 300 by including stage 420 instead of stage 320. Stage 420 includes collecting less information than the information collected during stage 320. Stage 420 can include collecting only the bitloading map and SNR margin, or even only the estimated loop length.

It is noted that when less information is collected, the computed PSD shapes will become more conservative and the tradeoff between minimizing repeater locations and maximizing bitrate per copper pair will be less favorable.

Figure 5:
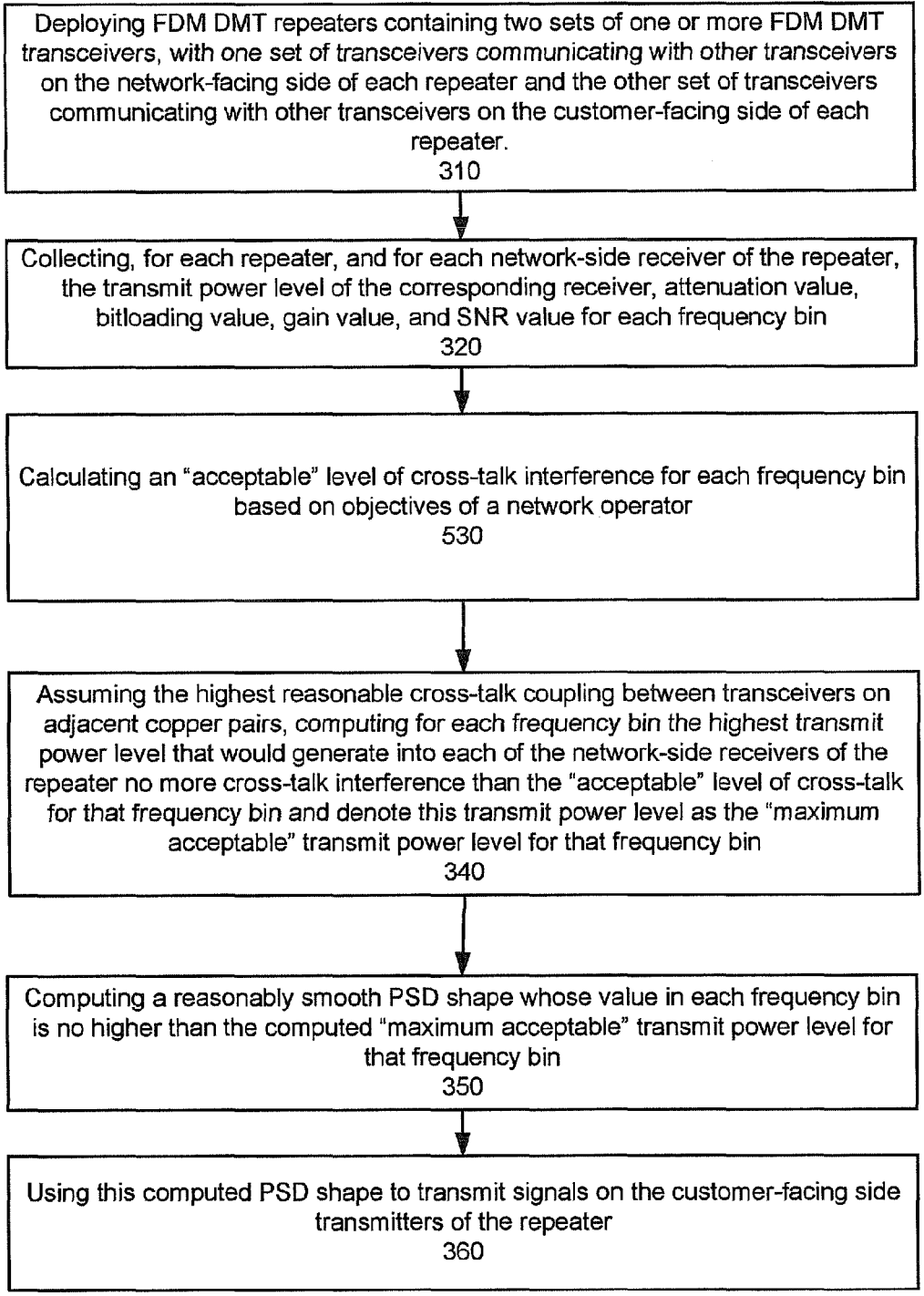
FIG. 5 illustrates a method according to an embodiment of the invention.

FIG. 5 illustrates method 500 according to an embodiment of the invention.

Method 500 differs from method 300 by including stage 530 instead of stage 330. Stage 530 includes calculating an "acceptable" level of cross-talk interference for each frequency bin based on objectives of a network operator.

As an example, the network operator may be willing to accept a higher level of spectral impact into CO-deployed services in order to achieve higher bitrates for repeatered links that generate higher revenue than residential services. As another example, in cases where the repeater is located far from the CO, the FEXT generated from CO-deployed transmitters may be below the noise floor, and therefore may be too low to be considered "acceptable" interference; in that case, a more appropriate "acceptable" level of interference may be cross-talk that results in an SNR reduction of 0.5 dB or less for the downstream receivers of CO-deployed services.

According to various embodiments of the invention a method may be provided that includes stages 310, 320 or 420, 330 or 530, and 360.

According to another embodiment of the invention a method for determining a location of FDM DMT transceivers is provided. The method can determine an optimal or near-optimal selection of FDM DMT repeater locations.

When a carrier is planning the deployment of repeatered links in "greenfield" scenarios, it would be desirable to design the topology of these links so that the number of repeater locations is minimized, while at the same time the bitrate per pair is high enough to achieve the desired total bitrate for the repeatered link using a reasonable number of bonded copper pairs.

FIG. 1 illustrates FDM DMT repeater 30 and its environment according to an embodiment of the invention.

A repeatered link is established between a CO modem 10 and a cabinet modem 20. The repeatered link includes a first segment 70 and a second segment 80. The first segment 70 connects CO modem 10 to network-side transceivers of the FDM DMT repeater 30. The length of the first segment 70 is denoted L1. The first segment 70 connects the cabinet modem 20 to a customer-side transceiver of the FDM DMT repeater 30. The length of the second segment 80 is denoted L2.

The FDM DMT repeater 30 includes a network-side receiver 301 and a customer-side transmitter 303 that are connected to each other in a sequential manner. This sequence of components receives a network-side input signal Sin 91 and outputs a customer-side output signal Soc 92. Both signals convey the same information but differ from each other by one or more analog characteristics.

The FDM DMT repeater 300 also includes a network-side transmitter 306 and a customer-side receiver 304 that are connected to each other in a sequential manner. This sequence of components receives a customer-side input signal Sic 93 and outputs a network-side output signal Son 94. Both signals convey the same information but may differ from each other by one or more analog characteristics.

The FDM DMT repeater 30 may also include a processor 309 for controlling the operation of the various components of the FDM DMT repeater 30. Additionally or alternatively, processor 309 can calculate levels of NEXT interferences, maximum acceptable transmit power levels and modified power spectral density (PSD) shapes.

The network-side receiver 31 and the network-side transmitter 36 form a network-side transceiver. The customer-side receiver 34 and the customer-side transmitter 33 form a customer-side transceiver.

The analog to digital conversion of Sin 91 may be executed by network-side receiver 31. The digital to analog conversion of that digital signal to an analog signal Soc 92 may be executed by the customer-side transmitter 33.

The analog to digital conversion of Sic 93 may be executed by customer-side receiver 34. The digital to analog conversion of that digital signal to an analog signal Son 94 may be executed by the network-side transmitter 36.

The processor 309 may execute any of methods 300, 400 and 500. The processor may, for example, be arranged to (i) compute, for multiple frequency bins of a spectrum, a level of far-end cross-talk (FEXT) interference that is generated to the network-side receiver by a service provider transmitter that provides an FDM DMT service that is supported by the FDM DMT repeater; (ii) compute, for the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter; and (iii) compute the modified power spectral density (PSD) shape so that in each of the multiple frequency bins, a value of the PSD does not exceed the highest allowable transmit power.

The processor 309 can include: (i) a FEXT calculator 3091 for computing, for multiple frequency bins of a spectrum, the level of FEXT interference that is generated to the network-side receiver by the service provider transmitter that provides an FDM DMT service that is supported by the FDM DMT repeater; (ii) a highest allowable transmit power calculator 3092 for computing, for the multiple frequency bins, the highest allowable transmit power level of the customer-side transmitter of the FDM DMT repeater that generates to the network-side receiver of the FDM DMT repeater the cross-talk interference that does not exceed the level of FEXT interference that is generated to the network-side receiver of the FDM DMT repeater by the service provider transmitter; (iii) a modified PSD calculator 3093 for computing a modified PSD shape so that in each of the multiple frequency bins, a value of the PSD does not exceed the highest allowable transmit power. Each of first and second segments 70 and 80 includes a pair of copper wires. These pairs of copper wires are bonded with other pairs of copper wires 60 that are used to couple residential DSL modems 31-35 to a residential service provider such as DSLAM 40 (that includes a service provider transmitter and a service provider receiver) that is located at the CO. All of these copper pairs may be located within a shared binder 50.

It is assumed that the network operator (also referred to as service provider or carrier) wishes to deploy a repeatered link with a bitrate of 50 Mbps downstream and 10 Mbps upstream at a distance of 5.5 km from the CO to extend the residential DSL coverage to more than 10 km. It is also assumed that residential CO-deployed DSL services are deployed at distances up to 5 km from the CO and that the "acceptable level" of interference generated by the repeatered link into the residential DSL services is equal to that generated by other CO-deployed residential DSL services (such as services deployed from DSLAM 40).

In this case, the spectral interference is determined primarily by the customer-side (downstream) DMT transmitters of the repeater, since those transmitters are located closest to the downstream residential DSL receivers at the customer locations.

In this case, a near-optimal solution would be to use eight bonded copper pairs and one repeater location placed at 3.3 km from the CO, so that L1=3.3 km and L2=2.2 km.

Sin 91 has a spectrum that includes multiple spectral components. Due to the uneven attenuation of different spectral components of Sin 91 by the copper pairs, the spectral components that are above a frequency threshold will not be received by DSL modems 31-35. The frequency threshold increases as the distance between FDM DMT repeater 30 and the DSL modem 31-35 increases. The PSD of Soc 92 is shaped so that its spectral components below that frequency threshold create acceptable interference to CO-deployed services that are using only bins at lower frequencies, such as DSL modems 31-35.

The PSD of Soc 92 is also shaped so that the spectral components of Soc 92 above the frequency threshold may be stronger and even much stronger than the spectral components of Sin 91 in order to facilitate higher bitrate.

Figure 2:
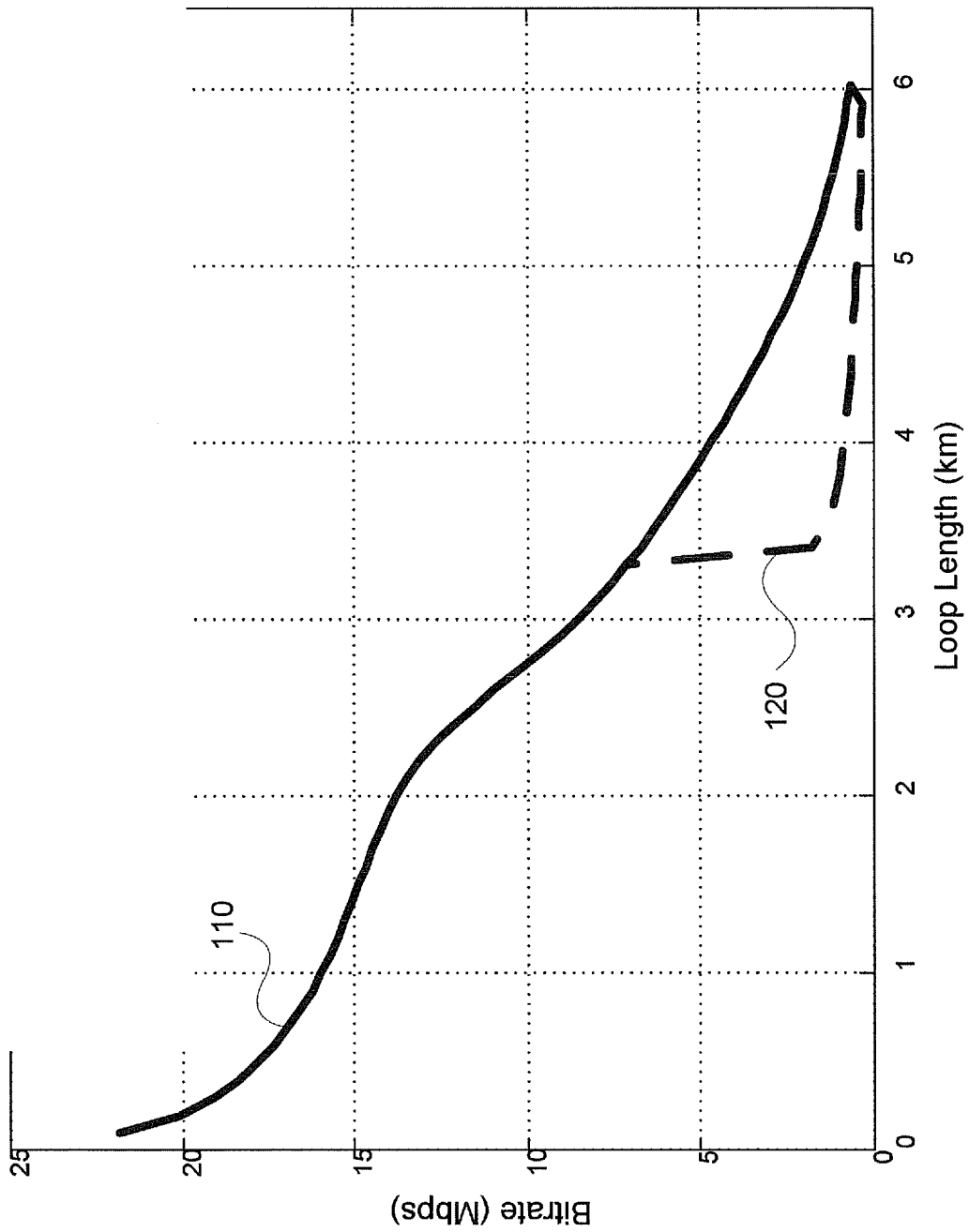
FIG. 2 illustrates relationships between bitrate and loop length in various repeater deployment scenarios.

FIG. 2 illustrates relationships between lowest downstream bit rate among residential ADSL2+ services and loop length in various scenarios.

Curve 110 illustrates a relationship between bitrates and loop lengths in two scenarios: (i) when only CO-deployed ADSL2 services are deployed (there are no repeaters) and (ii) when providing both CO-deployed ADSL2 services and additional services over a repeatered link that includes an FDM DMT repeater that alters analog characteristics (such as PSD) as illustrated above (in a manner illustrated in FIG. 1). This curve 110 indicates that the FDM DMT repeater 30 of FIG. 1 does not have a negative impact on the performances of XDSL modems 31-35.

Curve 120 illustrates a relationship between bitrates and loop lengths when providing both CO-deployed ADSL2 services and additional services over a repeatered link that includes an FDM DMT repeater that does not alter analog characteristics (for example does not change the PSD), but merely amplifies a received signal or retransmits a received signal using essentially the same frequency band and PSD shape as used by the corresponding service provider transmitter. At loop lengths above 3.4 Km the bit rate of other CO-deployed services dramatically decreases, as illustrated by curve 120.

The chart shown in FIG. 2 illustrates the significant improvement that results from using the present invention in the example of FIG. 1. The choice of the near-optimal location for the FDM DMT repeater at 3.3 km from the CO, combined with the use of the computed PSD shapes for the downstream transmitters of the repeater results in a dramatic reduction in the spectral interference into CO-deployed ADSL2+ services.

Curve 120 shows that a repeatered link without PSD shaping would cause a significant degradation in the downstream rate of CO-deployed ADSL2+ services whose receivers are located farther from the CO than the repeater, namely whose loops are longer than 3.3 km.

FIG. 6 illustrates method 600 according to an embodiment of the invention.

Method 600 starts by stage 610 of determining the total length of the repeatered link, the makeup of the copper loops (i.e., what is the gauge and length of the copper wires that make up these loops), the maximum number of repeater locations, the maximum number of copper pairs that can be included in the bonded copper link, the desired bitrate of the repeatered link, the possible locations of residential DSL receivers that need to be protected from spectral interference, and the maximum acceptable level of interference on residential DSL receivers at each of these possible locations.

Stage 610 is followed by stage 620 of defining a vector of possible segment lengths for each of the segments in the repeatered link.

Stage 620 is followed by stage 630 of calculating modified PSD shapes for each combination of segment lengths and number of copper pairs per bonded link and estimating, based on the modified PSD shapes, the maximum achievable bit rate of each combination.

Stage 630 can include calculating modified PSD shapes based on the maximum acceptable level of interference determined during stage 620 and based on acceptable levels of cross-talk and maximum acceptable transmit power level.

Stage 630 can include repeating stages 320-350 of method 300 for each possible combination of segment lengths that add up to the total length of the repeatered link, and for each number of copper pairs in the bonded link, using the maximum acceptable level of interference defined in stage 610.

Stage 630 is followed by stage 640 of identifying a group of combinations of segment lengths and number of copper pairs that can provide the desirable bitrate on the repeatered link while generating no more than the maximum acceptable level of interference on residential DSL services.

Stage 640 is followed by stage 650 of selecting, out of the group of combinations, a selected combination that optimizes (or nearly optimizes) a specified criterion, such as: (i) Minimize the total equipment cost of the repeatered link; (ii) Minimize the total operational cost of the repeatered link; (iii) Minimize the number of repeater locations; (iv) Minimize the number of copper pairs in the repeatered link; (v) Minimize the spectral impact on residential DSL services; (vi) Maximize the achievable bitrate of the repeatered link.

It is noted that method 600 encompasses only some of the possible options for optimal selection of repeater locations. There are many other embodiments that implement the same concept in different ways with additional modifications to the above algorithm.

Figure 7:
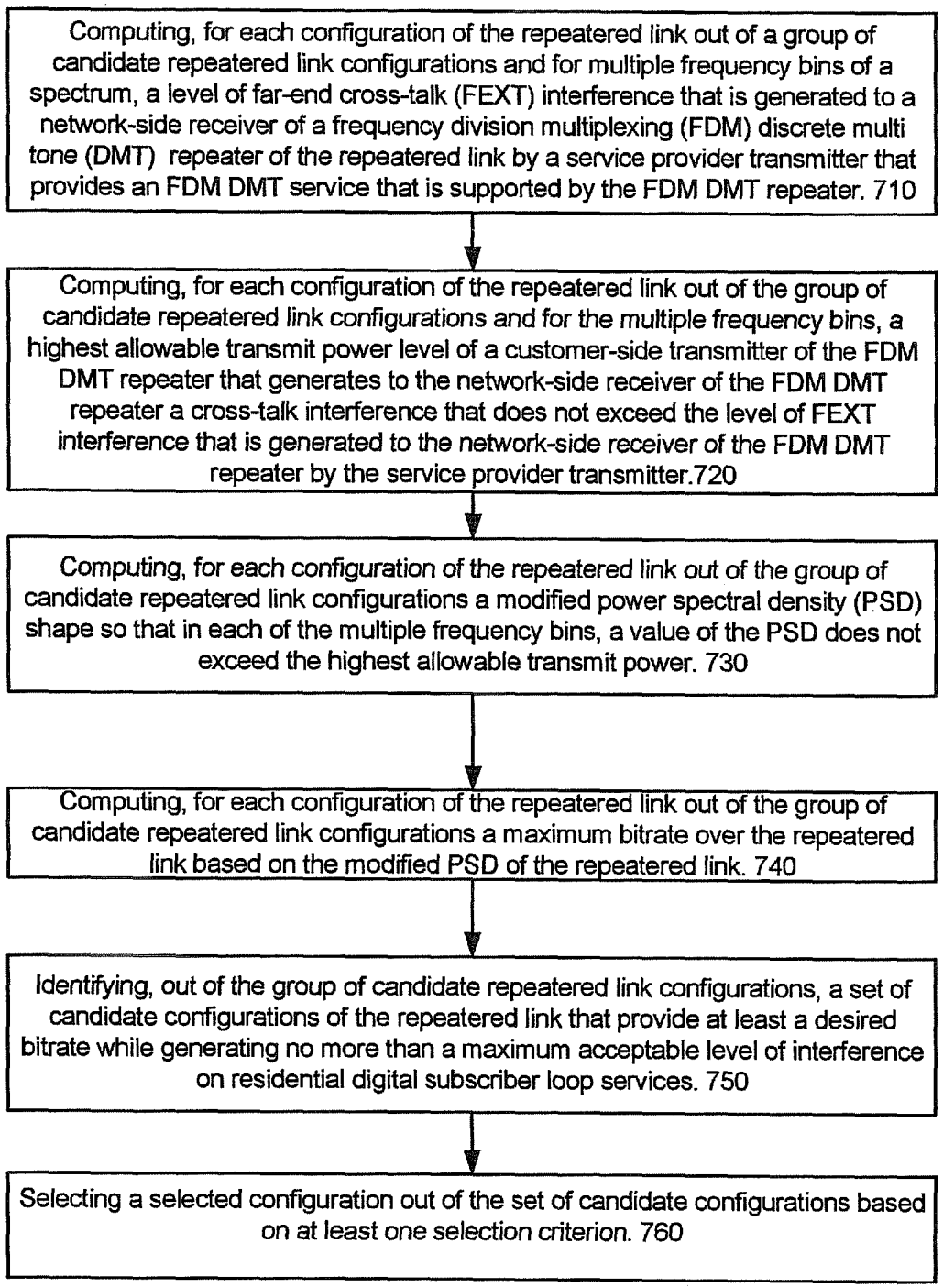
FIG. 7 illustrates a method according to an embodiment of the invention.

FIG. 7 illustrates method 700 for determining a configuration of a repeatered link, according to an embodiment of the invention.

Method 700 starts by stage 710 of computing, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater.

Stage 710 can include defining the group of the candidate repeatered link configurations based on at least two of the following parameters: a total length of the repeatered link, a makeup of copper loops, a maximum number of repeater locations, a maximum number of copper pairs that can be included in a bonded copper link that comprises a copper pair to which the FDM DMT repeater is connected, a location of residential digital subscriber loop receivers to be protected from spectral interference, and a maximum acceptable level of interference on residential digital subscriber loop receivers.

Stage 710 is followed by stage 720 of computing, for each configuration of the repeatered link out of the group of candidate repeatered link configurations and for the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter.

Stage 720 is followed by stage 730 of computing, for each configuration of the repeatered link out of the group of candidate repeatered link configurations a modified power spectral density (PSD) shape so that in each of the multiple frequency bins, a value of the PSD does not exceed the highest allowable transmit power.

Stage 730 is followed by stage 740 of computing, for each configuration of the repeatered link out of the group of candidate repeatered link configurations a maximum bitrate over the repeatered link based on the modified PSD of the repeatered link.

Stage 740 is followed by stage 750 of identifying, out of the group of candidate repeatered link configurations, a set of candidate configurations of the repeatered link that provide at least a desired bitrate while generating no more than a maximum acceptable level of interference on residential digital subscriber loop services.

Stage 750 is followed by stage 760 of selecting a selected configuration out of the set of candidate configurations based on at least one selection criterion.

Stage 760 may include selecting a selected configuration of the repeatered loop based on at least one selection criteria that is selected from a group consisting of: minimizing a the total equipment cost of the repeatered link; minimizing a total operational cost of the repeatered link; minimizing a number of repeater locations; minimizing a number of copper pairs in the repeatered link; minimizing a spectral impact on residential digital subscriber loop services; and maximizing an achievable bitrate of the repeatered link.

Figure 8:
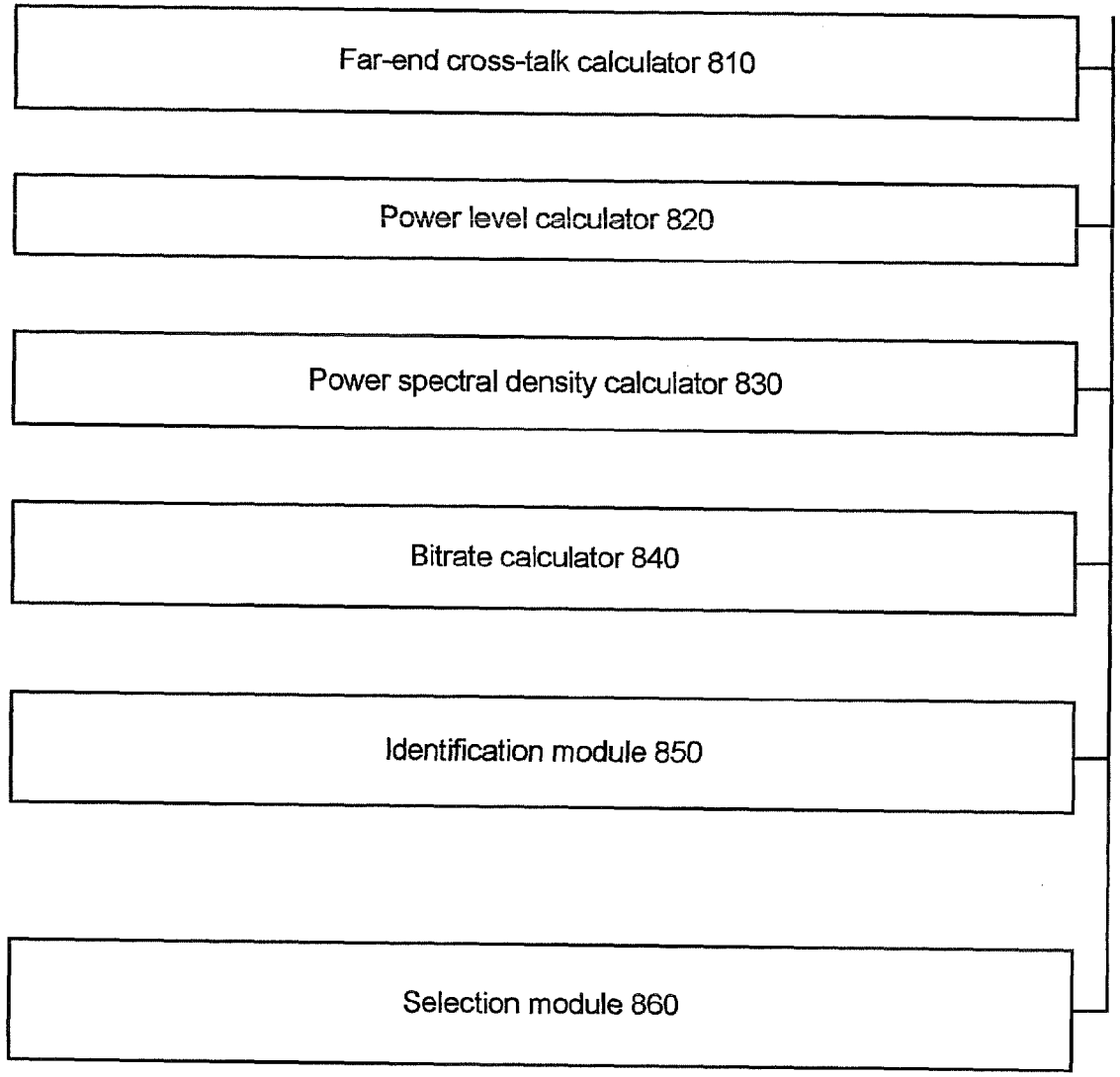
FIG. 8 illustrates a configuration system according to an embodiment of the invention.

FIG. 8 illustrates configuration system 800 according to an embodiment of the invention.

Configuration system 800 includes multiple components wherein at least one of these components is a hardware component. At least one component can be long to one computer while another component can belong to the same computer or to another computer. The configuration system 800 can execute methods 700 and, additionally or alternatively, method 800.

The components include: (i) far-end cross-talk calculator 810 to compute, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater; (ii) power level calculator 820, to compute, for each configuration of the repeatered link out of the group of candidate repeatered link configurations and for the multiple frequency bins, a highest allowable transmit power level of a customer-side transmitter of the FDM DMT repeater that generates to the network-side receiver of the FDM DMT repeater a cross-talk interference that does not exceed the level of FEXT interference that is generated to the network-side receiver of the FDM DMT repeater by the service provider transmitter; (iii) power spectral density calculator 830 to compute, for each configuration of the repeatered link out of the group of candidate repeatered link configurations a modified power spectral density (PSD) shape so that in each of the multiple frequency bins, a value of the PSD does not exceed the highest allowable transmit power; (iv) bitrate calculator 840 to compute, for each configuration of the repeatered link out of the group of candidate repeatered link configurations a maximum bitrate over the repeatered link based on the modified PSD of the repeatered link; (v) identification module 850 to identify, out of the group of candidate repeatered link configurations, a set of candidate configurations of the repeatered link that provide at least a desired bitrate while generating no more than a maximum acceptable level of interference on residential digital subscriber loop services; and (vi) selection module 860 to select a selected configuration out of the set of candidate configurations based on at least one selection criterion.

The far-end cross-talk calculator 810 can define the group of the candidate repeatered link configurations based on at least two of the following parameters: a total length of the repeatered link, a makeup of copper loops, a maximum number of repeater locations, a maximum number of copper pairs that can be included in a bonded copper link that comprises a copper pair to which the FDM DMT repeater is connected, a location of residential digital subscriber loop receivers to be protected from spectral interference, and a maximum acceptable level of interference on residential digital subscriber loop receivers.

The selection module 860 can select a selected configuration of the repeatered loop based on at least one selection criteria that is selected from a group consisting of: minimizing a the total equipment cost of the repeatered link; minimizing a total operational cost of the repeatered link; minimizing a number of repeater locations; minimizing a number of copper pairs in the repeatered link; minimizing a spectral impact on residential digital subscriber loop services; and maximizing an achievable bitrate of the repeatered link.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for providing a service over a repeatered link that couples a service provider transceiver to a remote modem, the method comprising:

computing, for each frequency bin out of multiple frequency bins of a spectrum, a level of far-end cross-talk (FEXT) interference that is generated to a network-side receiver of a frequency division multiplexing (FDM) discrete multi tone (DMT) repeater by a service provider transmitter that provides an FDM DMT service that is supported by the FDM DMT repeater;

computing, for each frequency bins out of the multiple frequency bins, a highest allowable transmit power level of a customer-side transmitter of the FDM DMT repeater, wherein said highest allowable transmit power level is defined as a power level that generates to the network-side receiver of the FDM DMT repeater a cross-talk interference that does not exceed a level of FEXT interference that is generated to the network-side receiver of the FDM DMT repeater by the service provider transmitter;

computing, based on a power spectral density (PSD) shape of the network-side receiver input signals, a bitloading map of the network-side receiver and per-bin Signal-to-Noise Ratio of the network-side receiver, a modified PSD shape for downstream customer-side transmitters of the FDM DMT repeaters so that in each of the multiple frequency bins, a value of the modified PSD does not exceed the highest allowable transmit power of that frequency bin;

receiving by the network-side receiver of the FDM DMT repeater network-side input signals;

generating customer-side output signals that convey a same information as the network-side input signals but have the modified PSD shape; and transmitting to the remote modem the customer-side output signals.

2. The method according to claim 1, wherein the modified PSD shape differs from a PSD shape of the network-side input signals.

3. The method according to claim 1, comprising generating customer-side output signals that have high frequency spectral components that are stronger than corresponding high frequency spectral components of the network-side input signals.

4. The method according to claim 1, comprising determining a frequency threshold and defining high frequency spectral components as frequency components that exceed the frequency threshold, wherein the high frequency spectral components of the network-side input signal are not received by customer modems that are coupled to copper pairs that are bonded with a copper pair that is coupled to the remote modem.

5. The method according to claim 1, comprising computing the modified PSD based on at least one of the following parameters of a network-side receiver: transmit power level of the corresponding transmitter; attenuation value of a link segment between the network-side receiver and the service provider transceiver; a bitloading value for each of the multiple frequency bins; a gain value for each of the multiple frequency bins; and a signal to noise ratio value for each of the multiple frequency bins.

6. The method according to claim 1, comprising: computing the level of the FEXT interface while assuming a first level of cross-talk coupling between transceivers on adjacent copper pairs that are used to convey information to other remote modems; and computing the highest allowable transmit power level while assuming a second level of cross-talk between transceivers on adjacent copper pairs, wherein the second level is higher than the first level.

7. The method according to claim 1, comprising computing a smooth PSD shape.

8. The method according to claim 1, comprising converting the network-side input signals to digital signals and converting the digital signals to the customer-side output signals.

9. A frequency division multiplexing (FDM) discrete multi tone (DMT) repeater, comprising:

a network-side receiver for receiving network-side input signals;

a network-side transmitter;

a customer-side receiver;

a customer-side transmitter for generating customer-side output signals that convey a same information as the network-side input signals but have a modified power spectral density (PSD) shape;

a processor, for:

computing, for each frequency bin out of multiple frequency bins of a spectrum, a level of far-end cross-talk (FEXT) interference that is generated to the network-side receiver by a service provider transmitter that provides an FDM DMT service that is supported by the FDM DMT repeater;

computing, for each frequency bin out of the multiple frequency bins, a highest allowable transmit power level of a customer-side transmitter of the FDM DMT repeater, wherein said highest allowable transmit power level is defined as a power level that generates to the network-side receiver of the FDM DMT repeater a cross-talk interference that does not exceed the level of FEXT interference that is generated to the network-side receiver of the FDM DMT repeater by the service provider transmitter; and computing, based on a power spectral density (PSD) shape of the network-side receiver input signals, a bitloading map of the network-side receiver and per-bin Signal-to-Noise Ratio of the network-side receiver, the modified PSD shape for downstream customer-side transmitters of the FDM DMT repeaters so that in each frequency bin out of the multiple frequency bins, a value of the modified PSD does not exceed the highest allowable transmit power.

10. The FDM DMT repeater according to claim 9 wherein the processor comprises:

a FEXT calculator for computing, for each frequency bin out of multiple frequency bins of a spectrum, the level of FEXT interference that is generated to the network-side receiver by the service provider transmitter that provides an FDM DMT service that is supported by the FDM DMT repeater;

a highest allowable transmit power calculator for computing, for each frequency bin out of the multiple frequency bins, the highest allowable transmit power level of the customer-side transmitter of the FDM DMT repeater that generates to the network-side receiver of the FDM DMT repeater the cross-talk interference that does not exceed the level of FEXT interference that is generated to the network-side receiver of the FDM DMT repeater by the service provider transmitter;

a modified PSD calculator for computing the modified PSD shape so that in each frequency bin out of the multiple frequency bins, a value of the PSD does not exceed the highest allowable transmit power.

11. The FDM DMT repeater according to claim 9, wherein the processor is configured to compute a modified PSD shape that differs from a PSD shape of the network-side input signals.

12. The FDM DMT repeater according to claim 9, wherein the customer-side transmitter is configured to generate customer-side output signals that have high frequency spectral components that are stronger than corresponding high frequency spectral components of the network-side input signals.

13. The FDM DMT repeater according to claim 9, wherein the processor is configured to determine a frequency threshold and define high frequency spectral components as components that exceed the frequency threshold, wherein the high frequency spectral components of the network-side input signal are not received by customer modems that are coupled to copper pairs that are bonded with a copper pair that is coupled to the remote modem.

14. The FDM DMT repeater according to claim 9, wherein the processor is configured to compute the modified PSD on at least one of the following parameters: transmit power level of the network-side receiver; an attenuation value of a link segment between the network-side receiver and the service provider transmitter; a bitloading value; a gain value; and a signal to noise ratio value for each of the multiple frequency bins.

15. The FDM DMT repeater according to claim 9, wherein the processor is configured to: compute the level of the FEXT interface while assuming a first level of cross-talk coupling between transceivers on adjacent copper pairs that are used to convey information to other remote modems, and compute the highest allowable transmit power level while assuming a second level of crosstalk between transceivers on adjacent copper pairs, wherein the second level is higher than the first level.

16. The FDM DMT repeater according to claim 9, wherein the processor is configured to compute a smooth PSD shape.

17. The FDM DMT repeater according to claim 9, wherein the network-side receiver is configured to convert the network-side input signals to digital signals and the customer-side transmitter is configured to convert the digital signals to the customer-side output signals.

18. A method for determining a configuration of a repeatered link, the method comprises:
computing, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater;
computing, for each configuration of the repeatered link out of the group of candidate repeatered link configurations and for the multiple frequency bins, a highest allowable transmit power level of a customer-side transmitter of the FDM DMT repeater, wherein said highest allowable transmit power level is defined as a power level that generates to the network-side receiver of the FDM DMT repeater a cross-talk interference that does not exceed the level of FEXT interference that is generated to the network-side receiver of the FDM DMT repeater by the service provider transmitter;
computing, for each configuration of the repeatered link out of the group of candidate repeatered link configurations, based on a power spectral density (PSD) shape of the network-side receiver input signals, a bitloading map of the network-side receiver and per-bin Signal-to-Noise Ratio of the network-side receiver, a modified PSD shape for downstream customer-side transmitters of the FDM DMT repeaters so that in each frequency bin out of the multiple frequency bins, a value of the modified PSD does not exceed the highest allowable transmit power;
computing, for each configuration of the repeatered link out of the group of candidate re-peatered link configurations a maximum bitrate over the repeatered link based on the modified PSD of the repeatered link;
identifying, out of the group of candidate repeatered link configurations, a set of candidate configurations of the repeatered link that provide at least a desired bitrate while generating no more than a maximum acceptable level of interference on residential digital subscriber loop services; and
selecting a selected configuration out of the set of candidate configurations based on at least one selection criterion.

19. The method according to claim 18, comprising defining the group of the candidate repeatered link configurations based on at least two of the following parameters: a total length of the repeatered link, a makeup of copper loops, a maximum number of repeater locations, a maximum number of copper pairs that can be included in a bonded copper link that comprises a copper pair to which the FDM DMT repeater is connected, a location of residential digital subscriber loop receivers to be protected from spectral interference, and a maximum acceptable level of interference on residential digital subscriber loop receivers.

20. The method according to claim 18, comprising selecting a selected configuration of the repeatered loop based on at least one selection criteria that is selected from a group consisting of: minimizing a the total equipment cost of the repeatered link; minimizing a total operational cost of the repeatered link; minimizing a number of repeater locations; minimizing a number of copper pairs in the repeatered link; minimizing a spectral impact on residential digital subscriber loop services; and maximizing an achievable bitrate of the repeatered link.

21. A configuration system, the configuration system comprises:
a processor;
a far-end cross-talk calculator to compute, for each configuration of the repeatered link out of a group of candidate repeatered link configurations and for multiple frequency bins of a spectrum, a level of far-end cross-talk (FEXT) interference that is generated to a network-side receiver of a frequency division multiplexing (FDM) discrete multi tone (DMT) repeater of the repeatered link by a service provider transmitter that provides an FDM DMT service that is supported by the FDM DMT repeater;

a power level calculator, to compute, for each configuration of the repeatered link out of the group of candidate repeatered link configurations and for the multiple frequency bins, a highest allowable transmit power level of a customer-side transmitter of the FDM DMT repeater, wherein said highest allowable transmit power level is defined as a power level that generates to the network-side receiver of the FDM DMT repeater a cross-talk interference that does not exceed the level of FEXT interference that is generated to the network-side receiver of the FDM DMT repeater by the service provider transmitter;

a power spectral density calculator to compute, for each configuration of the repeatered link out of the group of candidate repeatered link configurations, based on a power spectral density (PSD) shape of the network-side receiver input signals, a bitloading map of the network-side receiver and per-bin Signal-to-Noise Ratio of the network-side receiver, a modified PSD shape for downstream customer-side transmitters of the FDM DMT repeaters so that in each frequency bin out of the multiple frequency bins, a value of the modified PSD does not exceed the highest allowable transmit power;

a bitrate calculator to compute, for each configuration of the repeatered link out of the group of candidate repeatered link configurations a maximum bitrate over the repeatered link based on the modified PSD of the repeatered link;

an identification module to identify, out of the group of candidate repeatered link configurations, a set of candidate configurations of the repeatered link that provide at least a desired bitrate while generating no more than a maximum acceptable level of interference on residential digital subscriber loop services; and a selection module to select a selected configuration out of the set of candidate configurations based on at least one selection criterion, wherein said calculators and modules are executed by said processor.

22. The configuration system according to claim 21, wherein the a far-end cross-talk calculator is to define the group of the candidate repeatered link configurations based on at least two of the following parameters: a total length of the repeatered link, a makeup of copper loops, a maximum number of repeater locations, a maximum number of copper pairs that can be included in a bonded copper link that comprises a copper pair to which the FDM DMT repeater is connected, a location of residential digital subscriber loop receivers to be protected from spectral interference, and a maximum acceptable level of interference on residential digital subscriber loop receivers.

23. The configuration system according to claim 21, wherein the selection module is to select a selected configuration of the repeatered loop based on at least one selection criteria that is selected from a group consisting of minimizing a the total equipment cost of the repeatered link; minimizing a total operational cost of the repeatered link; minimizing a number of repeater locations; minimizing a number of copper pairs in the repeatered link; minimizing a spectral impact on residential digital subscriber loop services; and maximizing an achievable bitrate of the repeatered link.

* * * * *